Nov. 1, 1955 S. S. BROWN 2,722,645
VOLTAGE CHANGER SWITCH FOR A.C. MOTOR
Filed Feb. 7, 1952 2 Sheets-Sheet 1
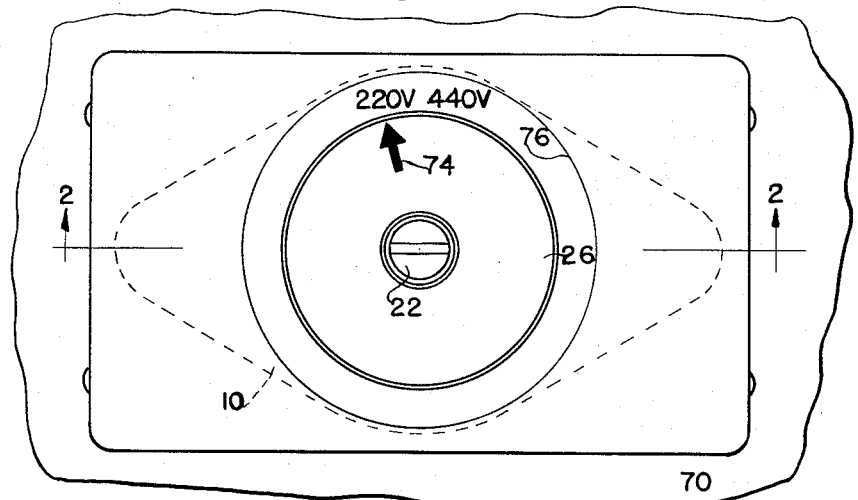
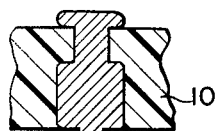
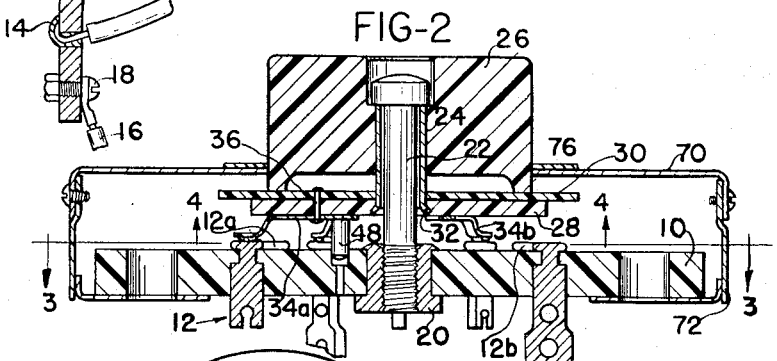
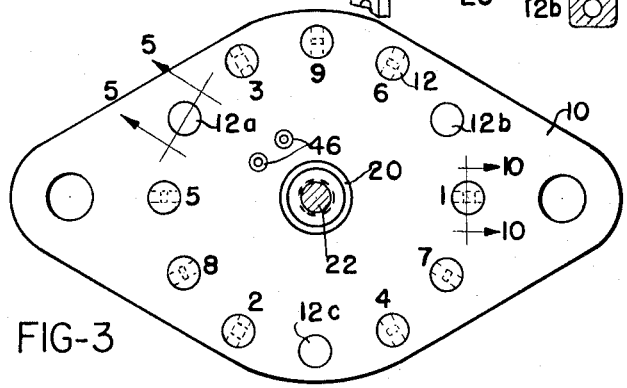
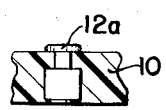
INVENTOR
STEFFEN S. BROWN
BY *Toulmin & Toulmin*
ATTORNEYS Nov. 1, 1955     S. S. BROWN     2,722,645
VOLTAGE CHANGER SWITCH FOR A.C. MOTOR
Filed Feb. 7, 1952     2 Sheets-Sheet 2

INVENTOR
STEFFEN S. BROWN
BY *Toulmin & Toulmin*
ATTORNEYS

United States Patent Office 2,722,645
Patented Nov. 1, 1955

2,722,645

VOLTAGE CHANGER SWITCH FOR A. C. MOTOR

Steffen S. Brown, Dayton, Ohio, assignor to The Brown-Brockmeyer Company, Dayton, Ohio, a corporation of Ohio Application February 7, 1952, Serial No. 270,453

10 Claims. (Cl. 318—225)

This invention relates to switches for use in connection with electric motors, and particularly to a switch for effecting changes in the operating voltage of 3-phase electric motors.

Most 3-phase electric motors are manufactured in such a manner that each winding is formed in two parts and leads are taken from each end of the said winding parts to a terminal box. Within the terminal box the windings can then be connected in series for operation at a higher voltage or in parallel for operation at a lower voltage. Such motors are usually Y-connected and when arranged in this manner, the terminal box will have therein six leads corresponding to the ends of the outer parts of the windings and three leads which correspond to the outer ends of the inner parts of the windings, the inner ends of the said inner parts being interconnected.

This invention is particularly concerned with the construction of a switch adapted for being mounted on a motor of the type referred to, and which switch comprises a stationary terminal plate to which the motor leads referred to above, are connected, as well as the three incoming power lines, and which switch also comprises a movable part adjustable for interconnecting the windings for either high voltage operation or low voltage operation.

The particular object of this invention is the provision of a switch of the nature referred to, which is simple and positive in operation.

Another object is the provision of such a switch which can be arranged to form a permanent part of the motor on which it is mounted.

Another object is the provision of a voltage change switch for a 3-phase motor, which includes means whereby the direction of rotation of the motor can readily be changed.

A still further object is the provision of a switch of the nature referred to which is extremely compact and which can, therefore, readily be built into the motor structure.

These and other objects and advantages will become more apparent upon reference to the following description taken in connection with the accompanying drawings, in which:

Figure 1 is an elevational view of the switch as it appears from outside the motor;

Figure 2 is a sectional view indicated by line 2—2 on Figure 1;

Figure 3 is a plan view looking at the stationary part of the switch and is indicated by line 3—3 on Figure 2;

Figure 5 is a sectional view indicated by line 5—5 on Figure 3 showing the manner in which one of the contact elements is mounted in the stationary part of the switch;

Figure 10 is a view similar to Figure 5 and is indicated by line 10—10 on Figure 3 and illustrates the construction of one of the contact elements of the stationary part of the switch which is employed for receiving one of the power line leads.

Figure 6:
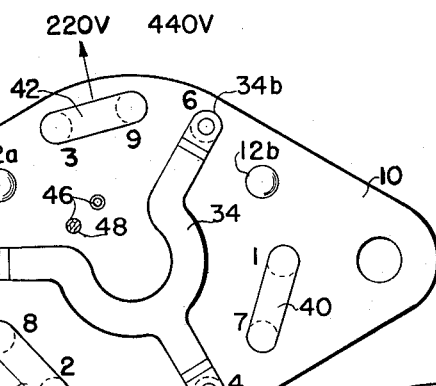
Figure 6 is a view showing the stationary portion of the switch and the position the movable contacts of the switch have when the switch is adjusted for operation of the motor at the lower voltage.

Referring to the drawings somewhat more in detail, the switch, according to this invention, comprises a stationary plate or panel of insulating material 10, best seen in Figures 2 and 3, and about which is mounted in uniformly spaced circumferential relation a plurality of contact elements generally indicated at 12. The contact elements indicated at 12a, 12b and 12c are dead elements, one of which is illustrated in Figure 5. These elements are not connected in circuit and merely form abutments for engaging the movable contact members in certain positions of adjustment thereof to prevent any tendency for the movable portion of the switch to tilt.

The others of the contact elements 12 are further identified by the numerals 1 through 9, and these elements project outwardly through the back of the panel 10 for connection with the leads of the motor. Three of the last-mentioned contact elements spaced 120° apart, and one of which is shown in Figure 10, project farther to the rear of panel 10 than the others of the contact elements for detachable connection with the power lines that supply energy to the motor.

In Figure 10 the contact element illustrated is adapted for receiving a motor lead at 14, which may advantageously be brought through a small hole in the contact element and soldered thereto, and the contact element is also adapted for receiving the power line 16 by means of the screw 18. The provision of the screw for connecting the power lines to the contact elements is of obvious advantage because it enables the motor to be readily connected in circuit at any place, and, additionally, at any time it is desired to change the direction of rotation of the motor, this can be accomplished easily by interchanging two of the power lines as to their connections to the contact elements.

In the center of panel 10 there is mounted a threaded bushing 20, and this bushing receives screw 22, which passes through metal sleeve 24, on which is permanently and rigidly mounted knob 26.

Sleeve 24 also receives a smaller insulating disc 28 and a larger insulating disc 30, and the sleeve is flared at its lower end at 32 for tightly clamping the discs against knob 26.

Figure 4:
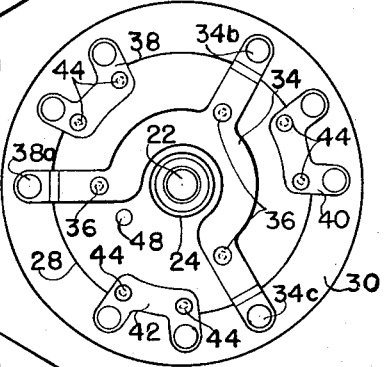
Figure 4 is a sectional view indicated by line 4—4 on Figure 2 and showing the movable portion of the switch.

Secured to the underside of smaller disc 28 are the movable contact members of the switch, and as will be seen in Figure 4, these comprise a first contact member 34, having three legs, 34a, 34b and 34c, located 120° apart. Contact member 34 is preferably secured to the discs by rivets 36.

Carried on the discs between the legs of contact member 34 are three smaller contact members 38, 40 and 42, which may be secured to the discs by the rivets 44. The last named contact members are each of such a size that they will bridge between two adjacent of the contact elements carried by panel 10.

The movable portion of the switch of this invention has two operative positions, and these are determined by the two apertures 46 in panel 10, which are engageable by pin 48 carried by disc 28. Pin 48 is of such a length that it must be disposed within one of the apertures 46 before the contact members of the movable part of the switch can engage any of the contact elements mounted in panel 10. In this manner there is provided positive means for preventing the adjustment of the switch to any improper position and it can be adjusted only into its two operative positions.

Furthermore, in moving the switch from its one position to the other, the contact members must be separated from the contact elements before the switch knob can be turned, thereby preventing any possibility of establishing any short circuits within the switch. It will also be evident that the contact members are so constructed that the portions thereof that engage the contact elements will do so resiliently whereby a wiping action between the members and elements will take place, which is effective for maintaining their mating surfaces clean and in good electrically conductive condition at all times.

Figure 7:
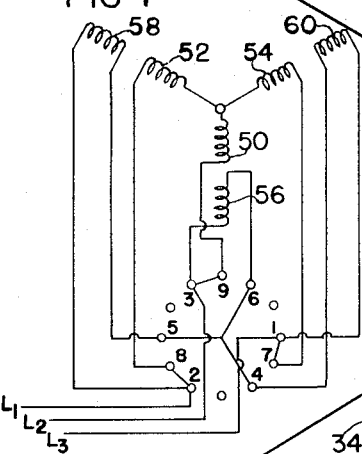
Figure 7 is a wiring diagram showing the connections which obtain when the switch is adjusted to its Figure 6 position.

Turning now to Figures 6, 7, 8 and 9, Figure 6 shows the position which the switch occupies when it is adjusted for operation of the motor at a lower voltage. The connections established by the switch are illustrated in Figure 7, and in this latter view, it will be noted that the inner parts 50, 52 and 54 of the windings which have their inner ends interconnected, have their outer ends connected by the contact members 38, 40 and 42, with the power lines L1, L2 and L3.

At the same time, the outer parts 56, 58 and 60 of the windings have their inner ends interconnected by the three-legged contact member 34, while their outer ends are connected with power lines L1, L2 and L3 by virtue of being connected to the same contact elements 1, 2 and 3.

Figure 8:
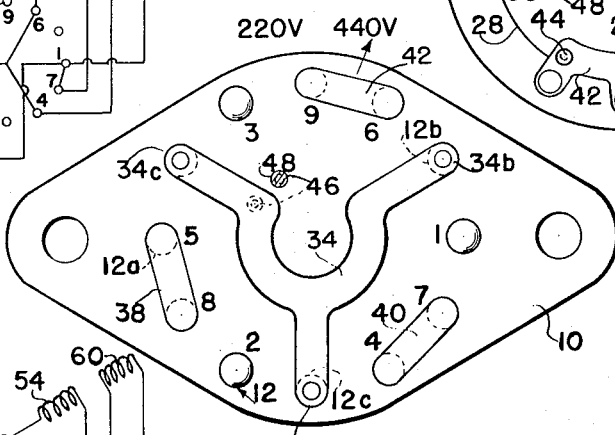
Figure 8 is a view like Figure 6, but showing the switch adjusted to a position where the motor will operate at the higher voltage.
Figure 9:
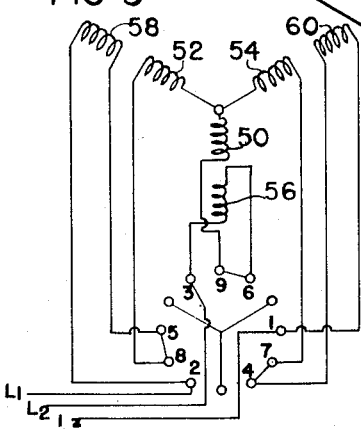
Figure 9 is a view like Figure 7, but showing the connections that obtain between the motor leads when the switch is in its Figure 8 position.

In Figure 8 the switch is adjusted for operation of the motor at the higher voltage, and the circuit connections that obtain with the switch so adjusted are illustrated in Figure 9. In Figure 9 it will be observed that the three-legged contact member 34 is positioned so that its legs engage the dead contact elements 12a, 12b and 12c. This contact member is thus not a part of the circuit when the switch is in its Figure 8 position.

The smaller contact members 38, 40 and 42 are positioned so that they bridge between contact elements 6 and 9, between contact elements 4 and 7, and between contact elements 5 and 8. The bridge connections made by the smaller contact members serve to connect the outer ends of the inner windings 50, 52, 54 with the inner ends of the outer windings 56, 58, 60, respectively, and this places the windings in series because the outer ends of the outer windings are permanently connected with the power lines L1, L2 and L3, while the inner ends of the inner windings are permanently connected together.

It will be understood in the foregoing description of the various circuit connections that the terms "inner" and "outer" refer merely to the location which the winding parts occupy in the wiring diagrams of Figures 7 and 9, and it is not intended to indicate any specific physical arrangement of the windings in the motor.

The described switch can be mounted in the motor in any suitable and convenient manner, and simply by way of illustration there is shown in Figures 1 and 2 a housing for enclosing at least the outer part of the switch, and this consists of a covering part 70 apertured for receiving knob 26, and a part 72 connected to the cover and extending about at least a part of the periphery of panel 10. This entire unit may be mounted on the motor or in the terminal box of the motor or in any other convenient location in association with the motor.

The operation of the switch according to this invention is extremely simple, and to change the operating voltage of the motor, it is only necessary to back out screw 22 far enough so that knob 26 can be pulled out to disengage pin 48 from whichever of apertures 46 it is engaging, and the knob then turned to the desired location, as may be determined by the arrow 74 on the knob and the indices 76 which may be stamped or printed on cover 70.

When the switch is in its new position, knob 26 is pushed inwardly and screw 22 is then drawn up to lock the knob in place. The drawing up of the screw 22, not only serves positively to lock the movable part of the switch in position, but also assists in obtaining the beneficial wiping action of the contact members on the contact elements, as previously described.

It will be understood that this invention is susceptible to modification in order to adapt it to different usages and conditions, and accordingly, it is desired to comprehend such modifications within this invention as may fall within the scope of the appended claims.

I claim:

1. In a selector switch for selecting between high or low voltage operation of a three phase motor with the three legs of the motor winding each being formed in two equal parts, one end of one part of each leg being connected to a common point to form a Y, comprising, a stationary panel having twelve equally spaced contact elements therein, said elements being adapted for connection to the other end of the said one part of each leg of the winding and to both ends of the other part of each leg of the winding, and to the three lines of a three phase supply line, and a rotatable element rotatably supported on said panel having two sets of contact members, means for connecting one set of said members to spaced ones of said contact elements and means for connecting the other set of said members to adjacent ones of said contact elements, one of said contact members being electrically continuous throughout and said other member having an electrical discontinuity therein, said rotatable element having one position whereby the parts of each leg of the windings are in series, and a second position where the said parts are in parallel.

2. In a selector switch for selecting between high or low voltage operation of a three phase motor with the three legs of the motor winding each being formed in two equal parts, one end of one part of each leg being connected to a common point to form a Y comprising, a stationary panel having twelve equally spaced contact elements therein, three equally spaced of said elements being dead, and the three elements between each adjacent pair of dead elements adapted to be connected, respectively, to the opposite ends of the other part of one leg of the winding and to the other end of the said one part of the same said leg, a rotary element rotatably supported on said panel and comprising a first contact having means for connecting three equally spaced of said elements and second contact members on the rotary element for bridging two adjacent contact elements between each pair of the last mentioned equally spaced contact elements, and means for positioning said rotary element in a first position whereby the parts of each leg are in parallel and in a second position whereby the parts of each leg are in series, said first contact member resting on said dead elements when the rotary element is in its second position.

3. In combination with a three phase motor having each leg of the windings thereof divided into first and second equal parts with the said first parts interconnected at their inner ends to form a Y; a selector switch comprising a stationary panel having twelve contact elements mounted therein in equally spaced relation arranged in groups of four, the fourth element of each group adapted for connection to the outer ends of the second parts of the legs, the third elements adapted for connection to the outer ends of the said first parts of the legs, and the second elements adapted for connection to the inner ends of the said second parts of the legs; and rotary contact members comprising a first three armed member interconnecting three equally spaced of the contact elements, and second contact members interconnecting two adjacent elements between each pair of arms of the said first member.

4. In combination with a three phase motor having each leg of the windings thereof divided into first and second equal parts with the said first parts interconnected at their inner ends to form a Y; a selector switch comprising a stationary panel having twelve contact elements mounted therein in equally spaced relation arranged in groups of four, the fourth element of each group adapted for connection to the outer ends of the second parts of the legs, the third elements adapted for connection to the outer ends of the said first parts of the legs, and the second elements adapted for connection to the inner ends of the said second parts of the legs; and rotary contact members comprising a first multi-armed member interconnecting a plurality of equally spaced of the contact elements, and second contact members interconnecting a plurality of adjacent elements between each pair of arms of the said first members, the said adjacent elements being those immediately preceding the ones engaged by the arms of the said first member.

5. In combination with a three phase motor having each leg of the windings thereof divided into first and second equal parts with the said first parts interconnected at their inner ends to form a Y; and a selector switch comprising a stationary panel having twelve contact elements mounted therein in equally spaced relation arranged in groups of four, the fourth element of each group adapted for connection to the fourth element of the second parts of the legs, the third elements adapted for connection to the outer ends of the said first parts of the legs, and second elements adapted for connection to the inner ends of the said second parts of the legs; and rotary contact members comprising a first three armed electrically conductive means for interconnecting three equally spaced of the contact elements, and second electrically conductive means for interconnecting two adjacent of the elements between each pair of arms of the said first means, the said two adjacent elements being those two immediately preceding the ones engaged by the arms of the said first member, means for rotating said contact members together and having one position where the said parts of the legs are in parallel, and a second position where the said parts are in series, the said first means resting on the first elements in said second position.

6. In combination with a three phase motor having each leg of the windings thereof divided into first and second equal parts with the said first parts interconnected at their inner ends to form a Y; a selector switch comprising a stationary panel having twelve contact elements mounted therein in equally spaced relation arranged in groups of four, the fourth element of each group adapted to be connected to the outer ends of the second parts of the legs, the third elements adapted to be connected to the outer ends of the said first parts of the legs, and the second elements adapted to be connected to the inner ends of the said second parts of the legs; a three armed rotary contact member having one position where it interconnects the said second of the elements whereby said second parts of the legs are connected in a Y and having a second position where it interconnects the first elements, and other rotary contact members movable with said three armed member and operable in the said first position to connect the said third and fourth of the elements of each group, and operable in the said second position to connect the said second and third of the elements of each group.

7. In combination with a three phase motor having each leg of the windings thereof divided into first and second equal parts with the said first parts interconnected at their inner ends to form a Y; a selector switch comprising a stationary panel having twelve contact elements mounted therein in equally spaced relation arranged in groups of four, the fourth element of each group adapted to be connected to the outer ends of the second parts of the legs, the third element adapted to be connected to the outer ends of the said first parts of the legs, the second element adapted to be connected to the inner ends of the said second parts of the legs; a three armed rotary contact member having one position where it interconnects the said second of the elements whereby said second parts of the legs are connected in a Y and having a second position where it interconnects the first elements, and other rotary contact members movable with said three armed member operable in the said first position to connect the said third and fourth of the elements of each group, and operable in the said second position to connect the said second and third of the elements of each group, and the said fourth of said elements being adapted for connection with the three lines of a three phase electric power source.

8. In a selector switch of the nature described: a stationary panel having a plurality of equally spaced contact elements mounted thereon, a rotary portion mounted on said panel and having first and second contact means, said first means being isolated and electrically continuous throughout, said second means having an electrical discontinuity therein, and means for connecting said first means to separated ones of said contact elements and means for connecting said second means to groups of adjacent ones of said elements.

9. A selector switch of the nature described comprising a panel having a plurality of equally spaced contact elements mounted thereon, a three armed rotary contacting member and a plurality of separated bridging elements, each of said bridging elements being disposed between arms of said rotary contacting members, means for connecting said bridging elements to adjacent ones of said contact elements and means for connecting said rotary contacting member to spaced ones of said contact elements on opposite sides of said bridging elements, and means for rotating said rotary contacting member and bridging elements simultaneously relative to said contact elements.

10. A selector switch of the nature described comprising a panel having a plurality of equally spaced peripherally arranged contact elements mounted thereon, a three armed electrically conductive contacting member mounted for rotational movement relative to said panel, individual contacting members separated from each other by insulation means and mounted for rotation with said contacting member, means for connecting said individual members to adjacent contact elements so as to electrically bridge said latter elements, and means for connecting said contacting member to spaced contact elements on said panel which lie on opposite sides of said individual member connections.

References Cited in the file of this patent

UNITED STATES PATENTS

| Number | Name | Date |
|---|---|---|
| 1,069,661 | Carman | Aug. 5, 1913 |
| 1,589,744 | Cohic | June 22, 1926 |
| 1,955,756 | MacGregor | Apr. 24, 1934 |
| 2,100,426 | Berger et al. | Nov. 30, 1937 |
| 2,230,536 | Hartzell et al. | Feb. 4, 1941 |
| 2,256,181 | Tyrner | Sept. 16, 1941 |
| 2,321,999 | Dalton | June 15, 1943 |
| 2,422,339 | Christie | June 17, 1947 |
| 2,445,434 | Hornbarger | July 20, 1948 |
| 2,460,415 | Gaylord et al. | Feb. 1, 1949 |
| 2,485,399 | Martin | Oct. 18, 1949 |